(12) United States Patent
Kinsey et al.

(10) Patent No.: US 8,166,473 B2
(45) Date of Patent: Apr. 24, 2012

(54) METHOD AND SYSTEM FOR A RESOURCE NEGOTIATION BETWEEN VIRTUAL MACHINES

(75) Inventors: Jeffrey Brian Kinsey, Redmond, WA (US); Pankaj Garg, Redmond, WA (US); Eric P. Traut, Bellevue, WA (US); Dustin L. Green, Redmond, WA (US); Parag Chakraborty, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1830 days.

(21) Appl. No.: 11/112,273

(22) Filed: Apr. 21, 2005

(65) Prior Publication Data

US 2006/0242641 A1 Oct. 26, 2006

(51) Int. Cl.
*G06F 9/455* (2006.01)
*G06F 9/46* (2006.01)
*G06F 15/173* (2006.01)

(52) U.S. Cl. .............................. 718/1; 718/105; 709/226

(58) Field of Classification Search ............... 718/1, 105
See application file for complete search history.

(56) References Cited

U.S. PATENT DOCUMENTS

| 5,442,791 | A * | 8/1995 | Wrabetz et al. ............... 719/330 |
| 6,282,561 | B1 * | 8/2001 | Jones et al. .................... 718/104 |
| 7,170,862 | B1 * | 1/2007 | Mountcastle .................. 370/254 |
| 7,251,815 | B2 * | 7/2007 | Donovan et al. .............. 718/105 |
| 7,328,437 | B2 * | 2/2008 | Donovan et al. .................. 718/1 |
| 2003/0200247 | A1 * | 10/2003 | Banzhaf et al. .................... 709/1 |

* cited by examiner

*Primary Examiner* — Camquy Truong
(74) *Attorney, Agent, or Firm* — Woodcock Washburn LLP

(57) ABSTRACT

A method of agreeing on the utilization of at least one computer resource between two virtual machines includes sending a first resource request by a first virtual machine to a second virtual machine having computer resources to allocate to the first virtual machine. The second virtual machine responds by sending at least one available resource for use by the first virtual machine. The first virtual machine can select from the at least one available resource. Both the first and second virtual machines can then execute on the agreed resource utilization by the first virtual machine and begin using the resource. When conditions change, either the first virtual machine or the second virtual machine can request a renegotiation of the agreement to use computer resources.

20 Claims, 5 Drawing Sheets

METHOD AND SYSTEM FOR A RESOURCE NEGOTIATION BETWEEN VIRTUAL MACHINES

CROSS REFERENCE TO RELATED APPLICATIONS

This application shares some subject matter with co-owned U.S. patent application Ser. No. 11/128,647 entitled "Partition Bus"filed May 12, 2005, now U.S. Pat. No. 7,689,800.

FIELD OF THE INVENTION

The invention relates to the field of computer programming. More specifically, the invention relates to resource negotiation between partitions in a virtual machine.

BACKGROUND OF THE INVENTION

Virtual computing allows multiple virtual machines or partitions, each having their own operating system, to run on a host computer. The host computer has a virtualizer program that allows the host computer to emulate the instructions of a virtual machine program; which may have a different computing model than the host computer. The host computer virtualizer program can also virtualize the hardware resources of the host machine for virtual machine use. The virtual machine that is requesting hardware resources such as CPU, memory, I/O and disk space may be called a device consumer or a client with respect to the partition that is providing the resource.

In a virtual machine system, a virtualizer program executing on the operating system software and hardware architecture of the host computer mimics the operation of an entire virtual computer partition. The virtualizer program acts as the interchange between the hardware architecture of the host machine and the instructions transmitted by the software (e.g., operating systems, applications, etc.) running within the emulated virtual machine partition environment. Generally, it is desirable to keep one virtual machine separated from the other virtual machines as well as separated from the host. Separation or isolation of one virtual machine from another is useful to segregate errors and faults such that one virtual machine fault does not affect another virtual machine. Yet, in some configurations, it is desirable to have one virtual machine access host resources available to a second virtual machine. However there are challenges to realizing such a scheme.

In some computer software applications on host computers, the system software drivers associated with a resource device communicate with the device to determine capacity and features. The software communicating with a device may have the ability to query the capacity and features of the device, but the device does not have the ability to alert the software if these features or capabilities change. Also, there is no protocol in the software and hardware's communication that allow for a guaranteed minimum level of service or contract in dealing with capacity and features. The lack of a fully interactive agreement between hardware and software can present problems if hardware changes or if software requirements change.

A partitioning environment using emulated devices has similar problems as the physical hardware environment of a host computer since the virtualized devices have already been defined by a physical device specification. One aspect of this problem is that as hardware gets more complex, there arises a desire for a more interactive method of capacity and feature negotiating between the hardware and software. This is especially true in a partitioning system for several reasons.

Computer resource providers may have to service multiple virtual machine partitions which share a single physical device. If the software in a resource consuming partition requires an added amount of performance, then the over-use of the computer resource by other partitions can leave one or more virtual partition resource consumers or clients unable to fulfill their requirements.

If the capacity or the features of a given computer resource change after partitioned resource consumers or clients have been initiated, there is no mechanism for altering the allocation of resources without restating either or both of the virtual machine resource client or the host resource provider.

Thus, there is a need for a system or method to provide a more flexible approach to the allocation of computer resources to accommodate changing requirements and capabilities. The present invention addresses the aforementioned needs and solves them with additional advantages as expressed herein.

SUMMARY OF THE INVENTION

An aspect of the invention includes a method and system for the negotiation of a contract of services between a computer resources services provider and computer resources services client. The services provider and services client may reside in different virtual machine partitions of a host computer. An aspect of the invention is a resolution of the problem of changing computer resource requirements by a resource client or changing resource availability as perceived by a resource provider. In one embodiment, a virtual services client requests computer resources from a virtual services provider and obtains, interactively, an agreement as to the granted resources. If the availability or usage of resources changes so as to invalidate the agreement, the virtual services provider can ask for a renegotiation of the computer resources with the virtual services client. If the virtual services client perceives a need to change the resources it requires for functionality, the virtual service client can request a renegotiation of the agreement of services.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

In one embodiment of the invention, virtual service provider can provide computer resources to a virtual service client. Protocols allowing communications between a virtual service provider and a virtual service client allow a back and forth negotiation and subsequent agreement between services requested and services granted. In one embodiment, the communications between the provider and client concern hardware and software resources and may be described as being a negotiation for capacity and features of client-needed resources for a virtual machine partition. One aspect of the invention includes the ability for a virtual service provider or a virtual service client to invalidate the existing contract for computer resources and demand a renegotiation and establishment of a new contract. In this manner, the virtual service client can be guaranteed a minimum level of service. Additionally, the virtual service provider can initiate a renegotiation of the service contract and can cause its changes to be reflected to the virtual service client.

Exemplary Embodiments of the Invention

Figure 1:
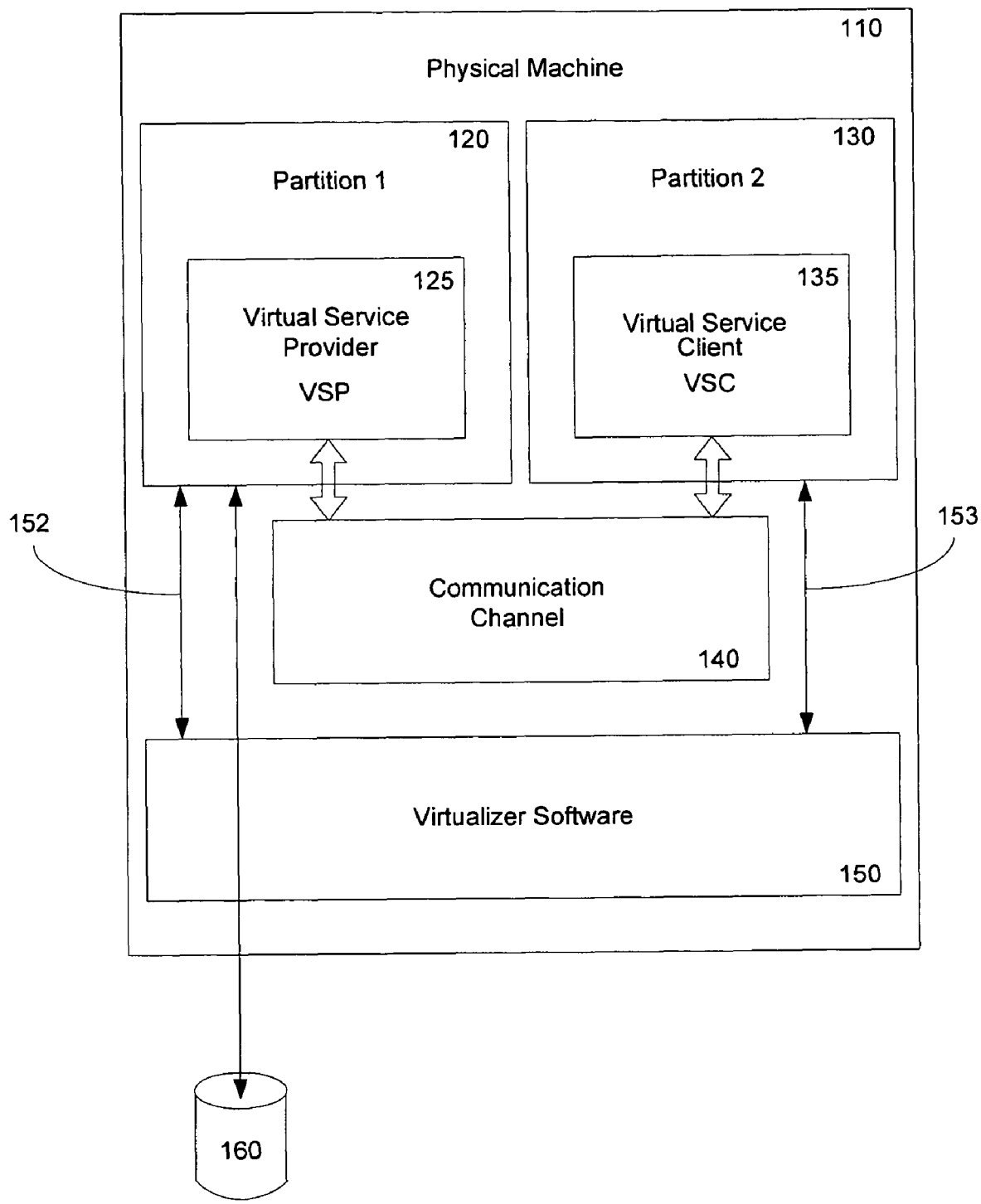
FIG. 1 is an exemplary system having partition and communications aspects of the invention.

FIG. 1 is a depiction of a computer system 100 having two partitions in a host computer having aspects of the invention. The partitions may be software entities, such as programs, virtual machines, virtual machine monitors, supervisory or client entities. A host computer 110 is a physical machine having access to hardware and software resources wherein the partitions reside. A first partition 120 is configured to be a virtual machine within the host computer 110. The partition 120 is capable of accessing host computer 110 resources via link 152 to the virtualization software 150. The partition 120 may access virtual devices which are resources made available to the partition to provide functionality for partition use. In the context of the current invention, one such virtual device is provided by the virtual service provider (VSP) 125.

A VSP provides device-related services to a virtual service client (VSC). The services provided do not necessarily look like what would be provided by any particular real hardware (HW) device; instead the services are often at a higher level of abstraction than what real HW would provide. The VSP may provide virtual device services without relying on any corresponding real HW. For example, a VSP may be a virtual video display device whose output is not currently being shown on any real display. This example may be implemented without the involvement of any real video display HW and may be implemented without being paired with any corresponding real video display HW. Alternately, the VSP may be doling out a portion of the resources of a specific corresponding real HW device In this instance, the VSC uses the HW resources to make it appear to the client partition that the client partition has a complete device of a similar type. For example, a file on an IDE disk 160 can be given to a partition and made to look like a complete SCSI disk (not shown). A VSP can provide all the resources of a real HW device to a VSC. An example occurs when a VSP provides all the storage space on a real disk to a corresponding VSC so that all the storage space of the real disk can be used by the VSC. A VSC can be in the same partition as a VSP. For example, a device emulator that happens to reside in the same partition as the VSP may include a VSC that the device emulator uses to request and use resources provided by the VSP. A VSC can be in a different partition from the VSP; in this case there is typically no device emulator involved. Many virtual devices or emulated devices may be needed by a partition or virtual machine to render functionality to the partition and the functionality of said devices may be provided via a virtualized service provider (VSP).

A second partition 130 also resides in system 100 and uses a link 153 to the virtualization software of the host computer 110 to provide the partition with functionality. In the context of the current invention, the second partition 130 contains a virtual service client (VSC) 135. A virtual service client (VSC) is the client of a virtual service provider (VSP). The VSC can also be thought of as the device driver for the abstract virtualized device that a VSP offers.

According to an aspect of the invention, a communication channel 140 is present and available to the first partition 120 having the virtual service provider 125 and the second partition 130 having the virtual service client 135. In one embodiment, the communication channel is a software entity acting to allow communications between virtual machine partitions. Embodiments of the communication channel 140 are the subject of a co-owned U.S. Pat. No. 7,689,800 entitled "Partition Bus."

In one embodiment, aspects of the invention may be realized in a virtual machine partitioning environment. FIG. 1 shows a single VSP and VSC. This could represent any of the VSPs required by the virtual machine partition including storage, network, video, input, or audio. In the virtual machine environment embodiment, the VSC and VSP will be in negotiation for capacity and features offered by the VSP using a communication channel 140.

Figure 2:
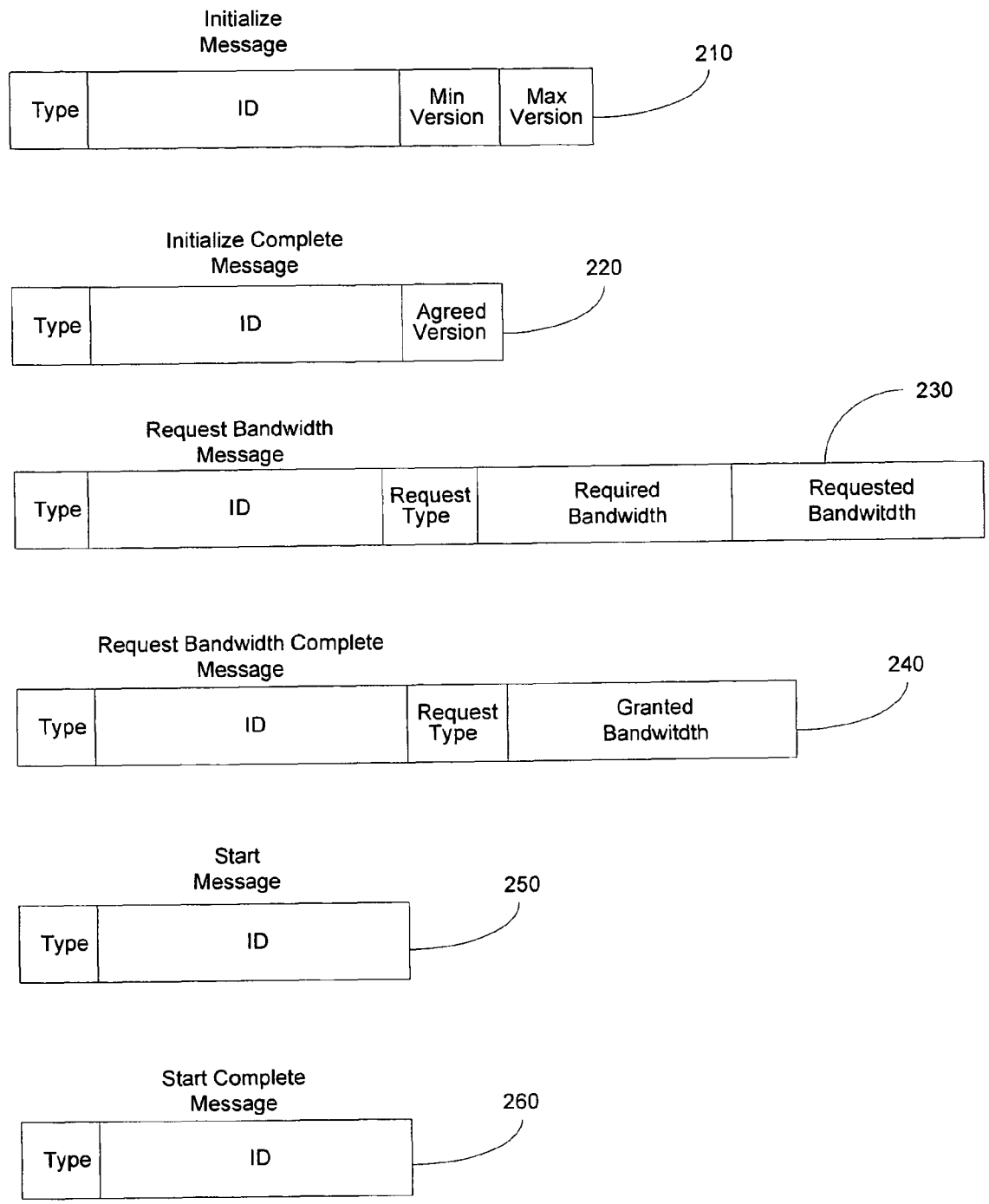
FIG. 2 is an exemplary set of communications protocols used in conjunction with an embodiment of the invention.

In one embodiment, the communication channel 140 may operate as a software medium allowing protocol transactions between virtual channels. FIG. 2 is a depiction of exemplary protocol formats consistent with aspects of the invention. Message 210 is an initialize message which maybe be used, for example, to send an initialize message from a VSC to a VSP. Message 220 is an initialize complete message which is may be used, for example, as a response by a VSP to a VSC. Message 230 is a request bandwidth message which may be used, for example by the VSC to request services or resources from a VSP. Message 240 is a request bandwidth complete message which may be used, for example, by a VSP to respond to a VSC concerning the resources available. Message 250 is a start message which may be used, for example, by the VSC to begin operations. Message 260 is a start complete message which may be used, for example, by a VSP to acknowledge a start of VSC resource operations. The protocols depicted in FIG. 2 are used as a base of exchanges across the communications channel 140 to enable the implementation of a request and response arrangement of resource allocation according to an aspect of the invention.

The exemplary protocols of FIG. 2 may be used to allow a negotiation of computer resources between two communicating partitions. Features and capacities of the computer resources may be requested, offered, accepted, granted and renegotiated as needed. The virtual service provider or the virtual service client may initiate a renegotiation as their circumstances change. Renegotiation can have the effect of providing a minimum level of service between a service provider and a service client if hardware changes from the point of view of the either partition. For example, hardware can undergo a capacity or feature change which may necessitate a renegotiation of a contract for service. Hardware can also appear to have changed as a result of a virtual partition being moved from one host machine to another. In one embodiment, a withdrawal of a granted service to a client may be withdrawn by the service provider. In such a circumstance, control of the granted resource would return to the service provider.

According to aspects of the invention, the protocols of FIG. 2 may be used to negotiate or renegotiate a contract of service for a multiplicity of hardware or software devices including, but not limited to a network device, a MAC address, a storage device, an input device, an audio device, a device driver, a video device, and an interface such as an I/O channel such as a USB device. For example, a network device negotiation feature may include the amount of bandwidth needed by a network device or the MTU (maximum transmission unit) used by the network device or its MAC address. A storage device negotiation feature may include the amount of bandwidth needed by a storage device, the amount of storage needed by a storage device, the read/write ability of a storage device or the disk cache capacity of a storage device. An input device negotiation feature may include the layout and keys of a keyboard device, or the layout, buttons, and wheels of a mouse device. An audio device negotiation feature may include the number of input and output channels present in an audio device, the depth of the channels for both input and output from an audio device or the ability to capture output from an audio device (DRM protection). A video device negotiation feature may include the amount of VRAM present in a video device, the 3D capabilities of a video device, the number of video overlays implemented by a video device or the ability to take a screen scrape of a video device (DRM protection). An I/O device negotiation feature may include the type and number of I/O channels. For example, the negotiation may include the number of devices supported by a USB bus device, the amount of bandwidth needed by a USB bus device or the supported versions of USB (e.g. 1.1, 2.0, or enhanced version).

Figure 3:
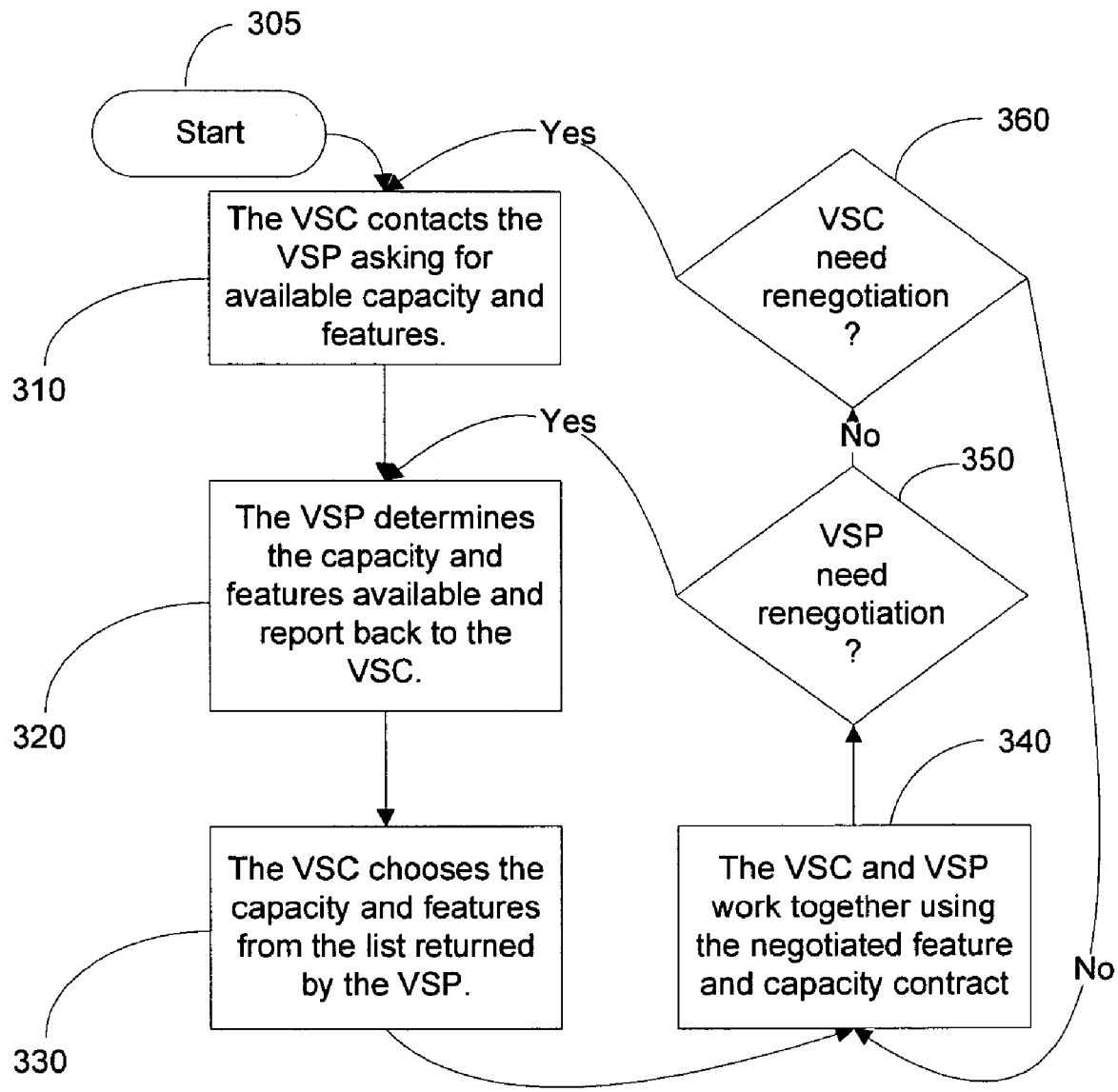
FIG. 3 is a flow diagram for an exemplary method of the invention.

FIG. 3 is a flow diagram which is exemplary of a method 300 of the invention. The method 300 starts 305 in a system where there is at least one VSP and one VSC. It is assumed that communication between the two virtual machine partitions containing the VSP and VSC is conducted via the communications channel 140. Initially, a VSC contacts the VSP asking for available capacity and features which the VSP may allocate (step 310). Here, the VSC is seeking resources from the VSP so that the VSC virtual machine partition may be functional. After receipt of the message, the VSP determines the capacity of resources and features available for the VSC partition. The VSP then reports back to the VSC (step 320) providing characteristics of the resources available to the VSC partition.

The VSC chooses the capacity and features than can accommodate its request from the features and capacities that were offered by the VSP (step 330). It should be noted that this exchange at steps 310, 320 and 330 are essentially a negotiation of resources or services needed by the virtual service client available of the virtual service provider. As such, this exchange is analogous to a negotiation of services requested, services available, and services accepted. The VSC and the VSP essentially agree on the level of services to be made available by the provider to the client and work together to utilize the services (step 340). At this step, execution of the agreement or contract for services between the two partition entities begins.

According to an aspect of the invention, changing circumstances may require a renegotiation of the "contract" or negotiated agreement for specific resources and capabilities services between the provider and the client. One such example circumstance may occur when hardware is updated, added or removed. Under these circumstances, the virtual service provider may no longer be able to honor the pre-existing agreement to provide services to the virtual services client. Alternately, the virtual service provider may have additional or different services in which the client might be interested. Accordingly, the provider preferably initiates a negotiation for a new "contract" corresponding to the services affected by the changed circumstances of updated, added or removed hardware. Another possible cause for changing conditions may be the need to re-allocate resources among different partitions. This may be determined as a result of some monitoring operation in the host computer or another administrative entity.

Step 350 is invoked if the VSP detects a change in circumstances causing the provider to request that the VSC utilize different resources. If the VSP does have a need to renegotiate the agreement for services (step 350), then the method 300 moves back to step 320 where the VSP determines the capacity and features that it may offer to the VSC and offers the VSC those changed services. As before, the VSC chooses the services it needs (step 330) and both the VSC and VSP execute on the contract and the agreed upon services are made available to the client partition. In another embodiment, the VSP may request a renegotiation of services provided to the VSC at step 350. The VSP may offer services to the VSC which differ from the already allocated resources being used by the VSC. The VSC may refuse the offer of a changed resource or service. The VSP may grant the VSC continued use of the already allocated resource.

If the VSP does not have changed circumstances as queried by step 350, then the VSC can determine if it needs changed services (step 360). The VSC may detect that it has a need for changed services because of several causes. One cause for changed services to a virtual service client would be if the partition were moved from one host computer to another. Under those circumstances, either the VSP or the VSC can detect the host system environment change and request different services. In another instance, a VSC may determine that the resources made available by the VSP are no longer functioning well enough for the VSC partition to function. In this instance, the VSC may determine that a new negotiation and contract for VSP services is appropriate.

If a renegotiation is not needed, the question at step 360 is answered in the negative and the VSC and VSP continue to honor their contacts and use the allocated resources for the benefit of the VSC (step 340). If the question at step 360 is answered positively and the VSC requests a change in resources, then the method 300 moves to step 310 where the VSC asks the VSP for a new set of available features and capacities of resources. Steps 320 and 330 follow until a new set of resources is agreed upon by the provider and client and acted upon in step 340. Thus the method 300 of FIG. 3 provides a vehicle for the updating of requirements and allocations based on needs perceived by either the virtual service provider or the virtual service client in a dynamic environment responsive to changes in any of the participating partitions as well as the host computer.

Figure 4:
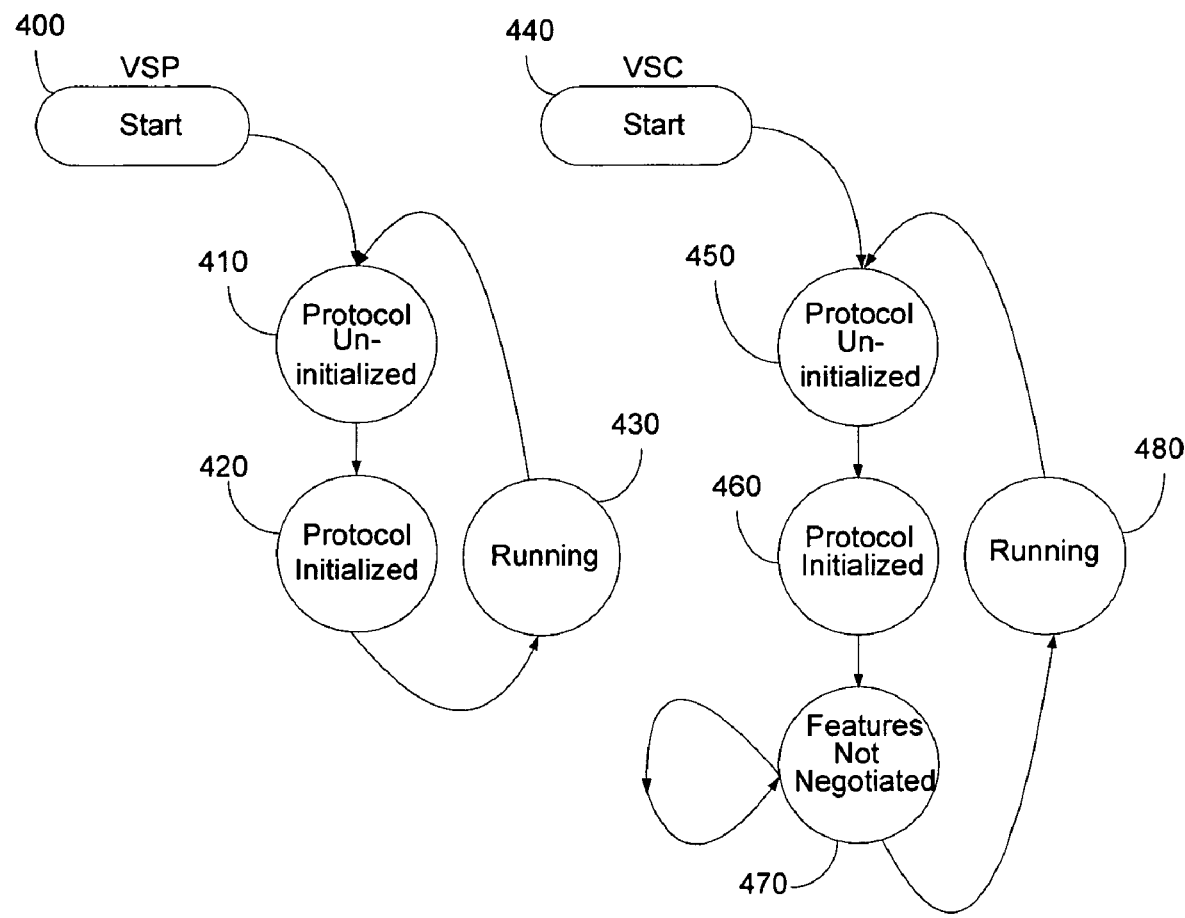
FIG. 4 is a set of exemplary state diagrams for a service provider and a service client according to aspects of the invention.

FIG. 4 represents two state diagrams; one for the virtual service provider and one for the virtual service client. A discussion of entry and exit into the various states of the VSP and VSC as they interact is provided as an additional example of the present invention. The individual states of FIG. 4 can be references to the activities that are performed at the states and the protocol messages of FIG. 2 that are exchanged.

Initially, both the VSP and VSC begin at the start positions at states 400 and 440 respectively. At state 440, the VSC can send an initialize message 210 of FIG. 2. The VSC can then enter into the protocol uninitialized state 450. The VSP receives the initialize message 210 and moves into the protocol uninitialized state 410. The VSP then responds by sending an initialize complete message 220 to the VSC. The VSP may then move into the protocol initialized state 420. The VSC receives the initialize complete message and moves into the protocol initialized state 460. At this time, both the VSP and VSC have agreed in a particular message protocol. In one embodiment of the invention, the protocol is representative of a protocol allowing the use of a virtual machine bus permitting communications between different virtual machine partitions.

With both VSC and VSP having an initialized protocol, the VSC can request features and capacities of resources that it requires for functionality of its virtual machine partition. When a VSC needs resources that are not already allocated, it moves to the features not negotiated state 470. From there, the VSC can send a request bandwidth message 230 to a VSP. The VSP can respond with a bandwidth complete message 240. It should be noted that the VSP may or may not grant the VSC the resource or bandwidth that the VSC requested. Accordingly, there may be a back and forth exchange or "negotiation" between the VSP and the VSC before a grant of resources is received by the VSC in the request bandwidth complete message 240.

After both VSP and VSC agree to the resource bandwidth that can be allocated to the VSC, then the VSC executes on the "contract" or agreement and send a start message 250 to the VSP. The VSC then moves into the running state 480. The VSP can send the start complete message 260 to the VSC in response to the start message 250. At this point the VSP can move into the running state 430. Since both VSP and VSC are in the running states, the VSC can utilize the resources available via the VSP.

In some circumstances, the VSP may detect that the resources being used by the VSC have changed. This can occur due to an upgrade, addition or removal of capacity or features of a resource. In another circumstance, the VSP may be informed that a re-allocation of resources to a VSC is required. The present invention allows a renegotiation of the "contract" for services between the VSP and the VSC. In the instance where the VSP discovers a need to renegotiate, the VSP moves from the running state 430 to the protocol initialized state 410. The VSP sends an initialize 210 message to the VSC. The VSC then detects that its resources are about to change and moves to the protocol uninitialized state 450.

Once in an uninitialized state, the VSC can send an initialize message 210 to the VSP. The VSP can respond with an initialization complete message 220. The VSC can then generate a request bandwidth message 230 to begin the process of exchanging bandwidth 230 and 240 messages between the VSC and VSP to obtain a new grant of resources. In this instance a re-negotiation of services for the VSC occurs and then the VSP can start to provide the granted services.

In another scenario, the VSC may be the entity that requests a change in services. For example, assuming that both VSC and VSP are in the running states of 480 and 430 respectively, a change in contract may be requested by the VSC. This may be precipitated by the VSC because the services granted by the VSP are no longer appropriate according to the resource utilization level of the VSC virtual machine partition. At that point, the VSC can detect the need for additional or changed resources and send an initialize message 210 to the VSP. The VSC can then enter into the protocol uninitialized state 450. The VSP receives the initialize message 210 and responds by moving into the protocol uninitialized state 410.

Both VSP and VSC are now in the protocol uninitialized states 410 and 450 respectively. As before, the VSP and VSC move into their protocol initialized states 420 and 460 respectively. The VSC generates the request bandwidth message 230 to identify its requested resources. The two entities negotiate the resources to be used by the VSC as described above and execute the agreement by entering the running states of 430 and 480 respectively. Thus it can be understood that if either the VSP or the VSC detects a need to renegotiate the agreement for services, then the current invention accommodates that need.

Exemplary Computing Device

Figure 5:
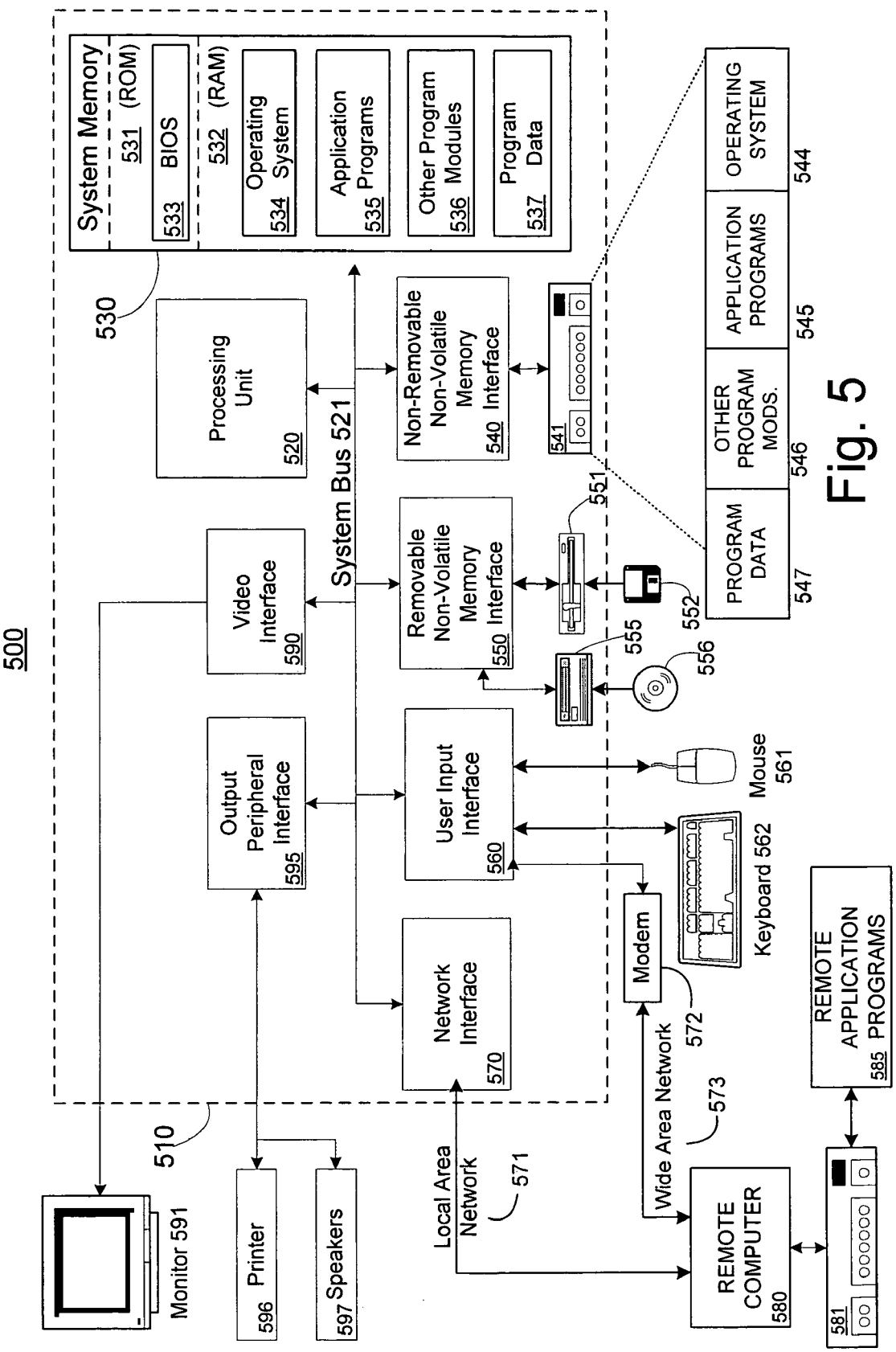
FIG. 5 is a block diagram showing an exemplary computing environment in which aspects of the invention may be implemented.

FIG. 5 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via one or more operating systems, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 5 thus illustrates an example of a suitable computing system environment 500 in which the embodiments of the invention may be implemented, although as made clear above, the computing system environment 500 is only one example of a suitable computing environment and is not intended to suggest any limitation as to the scope of use or functionality of an embodiment of the invention. Neither should the computing environment 500 be interpreted as having any dependency or requirement relating to any one or combination of components illustrated in the exemplary operating environment 500.

With reference to FIG. 5, an exemplary system for implementing an embodiment of the invention includes a general purpose computing device in the form of a computer system 510. Components of computer system 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 510 typically includes a variety of computer readable media. Computer readable media can be any available media that can be accessed by computer system 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer system 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system(s) 534, application programs 535, other program modules 536, and program data 537.

The computer system 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer system 510. In FIG. 5, for example, hard disk drive 541 is illustrated as storing operating system(s) 544, application programs 545, other program modules 546, and program data 547. Note that these components can either be the same as or different from operating system(s) 534, application programs 535, other program modules 536, and program data 537. Operating system(s) 544, application programs 545, other program modules 546, and program data 547 are given different numbers here to illustrate that, at a minimum, they are different copies. A user may enter commands and information into the computer system 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590, which may in turn communicate with video memory (not shown). In addition to monitor 591, computer systems may also include other peripheral output devices such as speakers 597 and printer 596, which may be connected through an output peripheral interface 595.

The computer system 510 may operate in a networked or distributed environment using logical connections to one or more remote computers, such as a remote computer 580. The remote computer 580 may be a personal computer, a server, a router, a network PC, a peer device or other common network node, and typically includes many or all of the elements described above relative to the computer system 510, although only a memory storage device 581 has been illustrated in FIG. 5. The logical connections depicted in FIG. 5 include a local area network (LAN) 571 and a wide area network (WAN) 573, but may also include other networks/buses. Such networking environments are commonplace in homes, offices, enterprise-wide computer networks, intranets and the Internet.

When used in a LAN networking environment, the computer system 510 is connected to the LAN 571 through a network interface or adapter 570. When used in a WAN networking environment, the computer system 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer system 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via one or more operating systems, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method for establishing and renegotiating a contract of computer resources. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method for allocating resources to a virtual machine, the method comprising:
   instantiating, on a computer system, the virtual machine in a first partition and a virtual service provider (VSP) in a second partition, the VSP configured to arbitrate use of a hardware device among a plurality of virtual machines;
   establishing a communications channel in a region of memory accessible to both the VSP and the virtual machine;
   receiving, from the virtual machine via the communications channel, a request to access the hardware device;
   receiving, from the virtual machine via the communications channel, a request for an amount of input/output bandwidth of the hardware device;
   sending, by the VSP via the communications channel to the virtual machine, information that indicates a first amount of available input/output bandwidth of the hardware device;
   receiving, from the virtual machine via the communications channel, a message indicative of acceptance of the first amount of available input/output bandwidth;
   allocating, by the VSP, at least a portion of the first amount of available input/output bandwidth;
   determining that a change request has been generated by one of the VSP and the virtual machine, the change request indicative of a renegotiation of resource utilization;
   sending, by the VSP via the communications channel, an indication of a second amount of available input/output bandwidth of the hardware device, the second amount being different from the first amount;
   receiving, by the VSP via the communications channel, a message indicative of acceptance of the second amount of available input/output bandwidth;
   allocating, by the VSP, at least a portion of the second amount of available input/output bandwidth;
   sending, by the VSP via the communications channel to the virtual machine, a message indicative of an offer for the virtual machine to utilize a resource different from the second amount of available input/output bandwidth;
   receiving, by the VSP via the communications channel from the virtual machine, a message indicative of a refusal of the offer for the virtual machine to utilize the resource different from the second amount of available input/output bandwidth; and
   sending, by the VSP via the communications channel to the virtual machine, a message indicative of the VSP granting the virtual machine continued use of the second amount of available input/output bandwidth.

2. The method of claim 1, wherein the request for the amount of the input/output bandwidth includes a request for a total amount of available input/output bandwidth of the hardware device.

3. The method of claim 2, further comprising:
sending, from the VSP to the virtual machine, a message indicative of an offer for the virtual machine to receive a portion of the total amount of the available input/output bandwidth;
sending, from the virtual machine to the VSP, a message indicative of the virtual machine accepting the offer; and
sending, from the VSP to the virtual machine, a message indicative of the VSP granting the request for the total amount of the available input/out bandwidth.

4. The method of claim 1, further comprising:
receiving, by the VSP via the communications channel, an indication that the virtual machine selected a portion of the available input/output bandwidth.

5. The method of claim 1, further comprising:
receiving, by the VSP via the communications channel from the virtual machine, a signal indicating that the input/output bandwidth allocated to the virtual machine is insufficient; and
increasing, by the VSP, the amount of input/output bandwidth allocated to the virtual machine.

6. The method of claim 1, wherein the hardware device is a graphics processing unit.

7. The method of claim 1, further comprising:
sending, by the virtual machine via the communications channel, input/output bandwidth requests to the VSP.

8. A computer system configured to allocate computer resources in a virtual machine computing environment, the system comprising:
a storage device; and
a processor, having access to computer memory having instructions, the instructions, when executed by the processor, cause the computing system to:
execute a virtual service provider (VSP) in a first partition;
instantiate a virtual service consumer (VSC) within a virtual machine running in a second partition;
instantiate a communications channel in a region of memory accessible to both a VSP and the VSC;
determine, based on information that indicates a current use of the storage device, a first amount of available storage capacity on the storage device and a first amount of available input/output bandwidth;
receive a request for the first amount of the available storage capacity and the first amount of the available input/output bandwidth;
receive, via the communications channel, a message indicative of acceptance of the first amount of the available storage capacity and the first amount of available input/output bandwidth;
allocate, by the VSP, at least a portion of the requested first amount of the available storage capacity on the storage device and the requested first amount of the available input/output bandwidth;
determine that a change request has been generated by one of the VSP and the VSC, the change request indicative of a renegotiation of resource utilization;
send, by the VSP via the communications channel, an indication of a second amount of available storage capacity and a second amount of available input/output bandwidth, the second amount of available input/output bandwidth being different from the first amount of available input/output bandwidth;
receive, by the VSP via the communications channel, a message indicative of acceptance or refusal of the second amount of available storage capacity and the second amount of available input/output bandwidth;
when the message is indicative of acceptance, allocate, by the VSP, at least a portion of the second amount of the available storage capacity and the second amount of the available input/output bandwidth;
when the message is indicative of refusal, sending, by the VSP via the communications channel to the VSC, a message indicative of the VSP granting the virtual machine continued use of the hardware device; and
when additional change requests have been generated by one of the VSP and the VSC, sending, by the VSP via the communications channel, additional indications of amounts of available storage capacity and available input/output bandwidth.

9. The system of claim 8, wherein the memory further comprises instructions that cause the system to:
send, by the VSP via the communications channel, a request to reduce the first or the second amount of available input/output bandwidth allocated to the virtual machine; and
reduce, by the VSP, the first or the second amount of allocated input/output bandwidth in response to an acknowledgment signal.

10. The system of claim 8, wherein the memory further comprises instructions that cause the system to:
determine, by the VSC, that the first or the second amount of allocated input/output bandwidth is insufficient;
receive, by the VSP via the communications channel, a request to increase the first or the second amount of allocated input/output bandwidth; and
increase the first or the second amount of input/output bandwidth allocated to the virtual machine.

11. The system of claim 8, wherein the memory further comprises instructions that cause the system to:
send, by the VSP via the communications channel, a request to reduce the first or the second amount of input/output bandwidth allocated to the virtual machine;
receive, by the VSP via the communications channel, a message from the VSC, the message including a rejection of the request to reduce the first or the second amount of input/output bandwidth allocated to the virtual machine.

12. The system of claim 8, wherein the memory further comprises instructions that cause the system to:
receive, by the VSP via the communications channel, a request to increase the first or the second amount of storage capacity allocated to the virtual machine; and
increase, by the VSP, the first or the second amount of storage capacity allocated to the VSC.

13. The system of claim 8, wherein the memory further comprises instructions that cause the system to:
receive, by the VSP via the communications channel, a request to reduce the first or the second amount of input/output bandwidth allocated to the virtual machine from the VSC; and
reduce, by the VSP, the first or the second amount of input/output bandwidth allocated to the virtual machine.

14. The system of claim 8, wherein the memory further comprises instructions that cause the system to:
receive, by the VSP, a request to increase the first or the second amount of input/output bandwidth allocated to the virtual machine by a first amount; and
send, by the VSP via the communications channel, a message to the VSC, the message offering to increase the amount of input/output bandwidth allocated to the virtual machine by a second amount, wherein the second amount is less than the first amount; and increase, by the VSP, the amount of input/output bandwidth allocated to the virtual machine by the second amount in response to a signal indicating that the virtual machine accepted the offered second amount of input/output bandwidth.

15. A computer storage medium having stored thereon computer-executable instructions for establishing availability of a computer resource in a virtual machine environment, that when executed on a computing device, cause the computing device to:

execute a virtual service provider (VSP) configured to control a hardware device in a first partition on a computer system, wherein the hardware device has associated therewith a set of hardware resources;

execute a virtual service consumer (VSC) in a virtual machine, wherein the virtual machine is configured to execute within a second partition on the computer system;

send, by the VSP, information that describes a status of each hardware resource in the set of hardware resources to the VSC via a communications channel established in a region of memory accessible to the VSP and the VSC;

request, by the VSC, a first parameter associated with an amount or identity of the hardware resource based on the status of each hardware resource via the communications channel;

grant, by the VSP, the request by sending, via the communications channel, a message indicative of said first parameter;

receive, from the VSC via communications channel, a message indicative of acceptance of the first parameter;

determine that a change request has been generated by one of the VSP and the VSC, the change request indicative of a renegotiation of resource utilization;

send, by the VSP via the communications channel to the VSC, a message indicative of an offer for the VSC to utilize a second parameter different from the first parameter, wherein the second parameter is associated with a different amount or identity of the hardware resource;

receive, by the VSP via the communications channel, a message indicative of acceptance or different refusal of the second parameter;

send, by the VSP via the communications channel to the VSC, a message indicative of the VSP granting the VSC continued use of the first parameter when the message is indicative of refusal;

when the message is indicative of acceptance, allocate, by the VSP, the second parameter; and when additional change requests have been generated by one of the VSP and the VSC, sending, by the VSP via the communications channel, additional messages indicative of offers for the VSC to utilize the first parameter, the second parameter, or another parameter.

16. The computer storage medium of claim 15, wherein the hardware device is a video card and the first parameter is an amount of video random access memory.

17. The computer storage medium of claim 15, wherein the hardware device is a network device and the first parameter is an amount of network bandwidth.

18. The computer storage medium of claim 15, wherein the hardware device is a network device and the first parameter is a media access card identifier.

19. The computer storage medium of claim 15, further comprising instructions that upon execution on the computing device, cause the computing device to:

determine, by the VSP, that the hardware device is over-committed;

send a request to adjust the second parameter associated with the hardware resource based to the VSC via the communications channel; and receive a message indicating that the VSC refused the request via the communication channel.

20. The computer storage medium of claim 15, further comprising instructions that upon execution on the computing device, cause the computing device to:

determine, by the VSP, that the hardware device is over-committed;

send a request to adjust the second parameter associated with the hardware resource based to the VSC via the communications channel; and adjust the second parameter in response to receipt of an acknowledgment signal received from the VSC via the communication channel.

* * * * *